(12) United States Patent
Fenton et al.

(10) Patent No.: US 10,921,860 B2
(45) Date of Patent: Feb. 16, 2021

(54) ARTICLES WITH TEXTURED SURFACES AND METHODS OF MAKING SAME

(71) Applicant: CORNING INCORPORATED, Corning, NY (US)

(72) Inventors: Matthew Wade Fenton, Elmira, NY (US); Yuhui Jin, Painted Post, NY (US); Timothy James Kiczenski, Corning, NY (US)

(73) Assignee: Corning Incorporated, Corning, NY (US)

( * ) Notice: Subject to any disclaimer, the term of this patent is extended or adjusted under 35 U.S.C. 154(b) by 97 days.

(21) Appl. No.: 16/190,930

(22) Filed: Nov. 14, 2018

(65) Prior Publication Data
US 2019/0155339 A1     May 23, 2019

Related U.S. Application Data

(60) Provisional application No. 62/589,119, filed on Nov. 21, 2017.

(51) Int. Cl.
*G06F 1/16*     (2006.01)
*B41M 3/00*     (2006.01)
(Continued)

(52) U.S. Cl.
CPC .......... *G06F 1/1656* (2013.01); *B41M 3/008* (2013.01); *B44C 3/025* (2013.01); *B05D 5/02* (2013.01);
(Continued)

(58) Field of Classification Search
CPC .......... G06F 1/1656; G06F 2200/1634; B41M 3/008; B44C 3/025; B05D 5/04;
(Continued)

(56) References Cited

U.S. PATENT DOCUMENTS

2011/0062619 A1    3/2011   Laine et al.
2017/0205541 A1    7/2017   Amin et al.
(Continued)

FOREIGN PATENT DOCUMENTS

WO    1999033906 A1    7/1999
WO    2007006006 A1    1/2007
WO    2009118507 A1    10/2009

OTHER PUBLICATIONS

International Search Report and Written Opinion PCT/US2018/061881 dated Mar. 6, 2019, 14 PGS.

*Primary Examiner* — Ruiyun Zhang
(74) *Attorney, Agent, or Firm* — Jeffrey A. Schmidt

(57) ABSTRACT

An article includes a substrate; a first layer disposed on the first major surface of the substrate, wherein the first layer has an adherence to the substrate of greater than or equal to 4B according to a cross hatch adhesion test set forth in ASTM D3359-17; and at least one ink layer disposed on the first layer having a surface roughness Ra greater than or equal 50 nm to provide a textured surface. Also disclosed is an article a substrate a coating disposed on the first major surface, wherein the coating has an adherence to the substrate of greater than or equal to 4B according to a cross hatch adhesion test set, a gauge hardness greater than or equal to 4H according to a pencil test, and a scratch hardness greater than or equal to 3H according to a pencil test set.

23 Claims, 6 Drawing Sheets

(51) Int. Cl.
  *B44C 3/02* (2006.01)
  *H04B 1/3888* (2015.01)
  *B05D 5/02* (2006.01)
(52) U.S. Cl.
  CPC .... *C09K 2323/06* (2020.08); *C09K 2323/061* (2020.08); *G06F 2200/1634* (2013.01); *H04B 1/3888* (2013.01)
(58) Field of Classification Search
  CPC .......... B05D 5/02; B05D 5/066; B05D 5/061; H04B 1/3888; Y10T 428/1086; Y10T 428/1095; C09K 2323/06; C09K 2323/061
  USPC ......... 428/1.6, 1.62; 427/511, 75; 106/287.1
  See application file for complete search history.

(56) References Cited

U.S. PATENT DOCUMENTS

| | | |
|---|---|---|
| 2017/0253755 A1 | 9/2017 | Chen et al. |
| 2018/0054904 A1 | 2/2018 | Dejneka et al. |

# ARTICLES WITH TEXTURED SURFACES AND METHODS OF MAKING SAME

CROSS-REFERENCE TO RELATED APPLICATIONS

This application claims the benefit of priority under 35 U.S.C. § 119 of U.S. Provisional Application Ser. No. 62/589,119 filed on Nov. 21, 2017, the content of which is relied upon and incorporated herein by reference in its entirety.

BACKGROUND

The present disclosure relates to articles having, and methods for providing, an improved textured surface on a substrate to provide a tactile feature, such as on a substrate used on a consumer article.

As the sophistication of consumers continues to evolve and increase, the importance of aesthetic features (such as tactile features and visual features), especially the integration of font) and function, also increases. Nowhere is this more evident than in the field of consumer electronics, such as in the design of mobile electronic devices (such as, mobile phones, smartphones, tablets, phablets, notebook computers, laptops, etc.). There have been many instances in which a consumer electronic device that exhibits some enhanced aesthetic feature over competing devices will enjoy significantly higher acceptance in the marketplace despite relatively comparable functional characteristics.

For example, there have been efforts in the marketplace to texture the surface(s) of a mobile electronic device to provide a tactile feature, such as to the back side of a mobile phone. Previous efforts to provide a textured surface having proven to be costly and time consuming. Accordingly, there are needs in the art for new articles having, and methods for providing, a textured surface on an article having a tactile feature.

SUMMARY

In a first aspect an article includes a substrate comprising a first major surface and a second major surface opposite the first major surface; a first layer disposed on the first major surface, wherein the first layer has an adherence to the substrate of greater than or equal to 4B according to a cross hatch adhesion test set forth in ASTM D3359-17; and at least one ink layer disposed on the first layer, wherein the at least one ink layer has a surface roughness Ra greater than or equal 50 nm to provide a textured surface.

In a second aspect, an article includes a substrate comprising a first major surface and a second major surface opposite the first major surface; a coating disposed on the first major surface, wherein the coating has an adherence to the substrate of greater than or equal to 4B according to a cross hatch adhesion test set forth in ASTM D3359-17, a gauge hardness greater than or equal to 4H according to a pencil test set forth in ASTM D3363-05(2011)e2, and a scratch hardness greater than or equal to 3H according to a pencil test set forth in ASTM D3363-05(2011)e2.

In a third aspect a consumer electronic product includes a housing having a front surface, a back surface and side surfaces; electrical components provided at least partially within the housing, the electrical components including at least a controller, a memory, and a display, the display being provided at or adjacent the front surface of the housing; and a cover substrate disposed over the display, wherein at least one of a portion of the housing or the cover substrate comprises any of the article described herein.

In a fourth aspect, a method for creating a textured surface includes applying a first layer to a first surface of a substrate such that the first layer has an adherence to the substrate of greater than or equal to 4B according to a cross hatch adhesion test set forth in ASTM D3359-17; and applying at least one ink layer to the first layer, wherein the at least one ink layer has a surface roughness Ra greater than or equal 50 nm to provide a textured surface.

In a fifth aspect, a method includes applying a coating to a first surface of a substrate such that the coating has an adherence to the substrate of greater than or equal to 4B according to a cross hatch adhesion test set forth in ASTM D3359-17, wherein the coating has a gauge hardness greater than or equal to 4H according to a pencil test set forth in ASTM D3363-05(2011)e2 and a scratch hardness greater than or equal to 3H according to a pencil test set forth in ASTM D3363-05(2011)e2.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
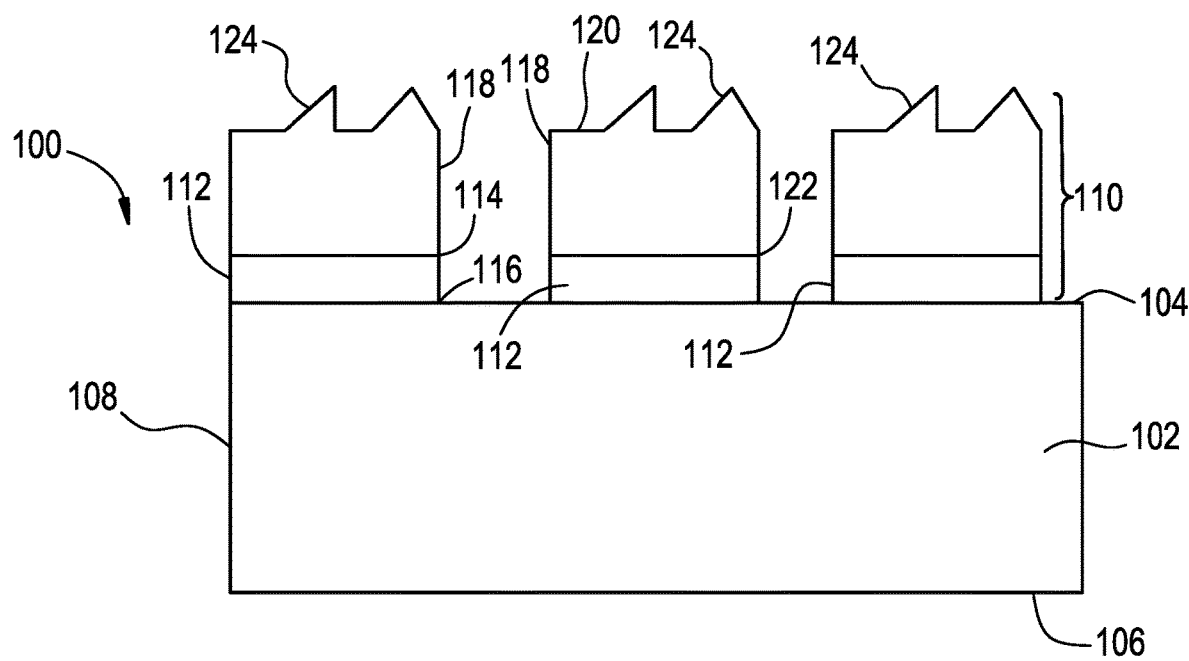
FIG. 1 is a side view of an exemplary article according to embodiments described herein.

Reference will now be made in detail to the present preferred embodiment(s), examples of which is/are illustrated in the accompanying drawings. Whenever possible, the same reference numerals will be used throughout the drawings to refer to the same or like parts.

The present disclosure relates to an article having a textured surface and a method for making such a textured article. In some embodiments, the article may be incorporated into a consumer electronic device (e.g., a mobile electronic device, a mobile phone, a smartphone, a tablet, a phablet, a notebook computer, a laptop, etc.) as part of the housing, for example the back side of the housing. In some embodiments, the textured surface of the article provides tactile feedback when touched. In some embodiments, a coating in the form of a first layer and at least one ink layer is applied to the surface of a substrate to form the textured surface. Forming the textured surface from a coating provides some benefits over other methods of forming a textured surface such as etching the surface. The benefits include (1) increased mechanical strength of the substrate because etching the substrate typically reduces the surface strength of the substrate; (2) an increase in cost and time efficiency because applying the coating is typically cheaper and faster than etching; and (3) increased safety and environmental friendliness because etching typically involves the use of acidic solutions which pose safety risks to workers and concerns with proper disposal of the acidic solutions.

The present disclosure also relates to an article having a coating with suitable gauge hardness (for example a value of 4H or greater, 5H or greater, or 6H as determined by a pencil test) and suitable scratch hardness (for example a value of 3H or greater, 4H or greater, 5H or greater, or 6H as determined by a pencil test) and a method for making such a coated article. In some embodiments, the article may be incorporated into a consumer electronic device (e.g., a mobile electronic device, a mobile phone, a smartphone, a tablet, a phablet, a notebook computer, a laptop, etc.) as part of the housing, for example the back side of the housing. In some embodiments, the coating is textured and provides tactile feedback when touched.

The articles and methods for making the articles will now be described with reference to the FIGS. FIG. 1 shows a side view of an exemplary article 100 with exemplary substrate 102 having a first major surface 104 and a second major surface 106 opposite first major surface 104 connected by at least one edge surface 108. A coating 110 is disposed on first major surface 104 of substrate 102. In some embodiments, coating 110 includes a first layer 112 having a first surface 114 and a second surface 116 and ink layer 118 having a first surface 120 and a second surface 122. Second surface 116 of first layer 112 is disposed on first major surface 104 of substrate 102 and second surface 122 of ink layer 118 is disposed on first surface 114 of first layer 112. First surface 120 of ink layer 118 functions as the textured surface of article 100. As used herein disposed means directly or indirectly (e.g., having one or more layers inbetween) contacting.

Substrate 102 may be glass-based or a polymer material. As used herein a "glass-based" used to include any object made wholly or partly of glass, including glass-ceramics (including an amorphous phase and a crystalline phase). Thus a glass-based substrate may be a glass substrate or a glass-ceramic substrate. In some embodiments, the glass-based substrate may be strengthened or non-strengthened. As used herein, the term "strengthened substrate" refers to a glass substrate or a glass-ceramic substrate that has been chemically strengthened, for example through ion-exchange of larger ions for smaller ions in the surface of the glass or glass ceramic substrate, through thermal tempering, or through other strengthening methods known in the art. In some embodiments, a glass substrate may be selected from soda-lime silicate glass, alkali-alumino silicate glass, alkali-containing borosilicate glass, alkali-containing alumino-borosilicate glass, and alkali-containing phosphosilicate.

In some embodiments, when the substrate is a polymeric material, suitable polymeric materials include, but are not limited to: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

Substrate 102 may be substantially planar, although other embodiments may utilize a curved or otherwise shaped or sculpted substrate (e.g., having a 2.5-dimensional or 3-dimensional shape). In some embodiments, the thickness of the substrate may vary along one or more of its dimensions for aesthetic and/or functional reasons. For example, the edges of the substrate may be thicker as compared to more central regions of the substrate. The length, width and thickness dimensions of the substrate may also vary according to the enclosure application or use.

In some embodiments, first layer 112 may be any suitable material that maintains a sufficient adherence of ink layer 118 to substrate 102, for example, first layer 112 has an adherence to substrate 102 and ink layer 118 of greater than or equal to 4B according to a cross hatch adhesion test set forth in ASTM D3359-17. In some embodiments, first layer 112 may act as a primer. In some embodiments, first layer 112 may be a polymer based material and may be thermally cured, for example in an oven, or cured by exposure to radiation, such as ultraviolet light (i.e., uv curable). In some embodiments, first layer 112 may contain a silicone resin component and in some embodiments, the silicon resin component may include a silsesquioxane component. In some embodiments, first layer 112 may be an ink, for example an inkjet ink. In some embodiments, the first layer may have a thickness of 3 µm or less, 2 µm or less, or 1 µm or less. In some embodiments, first layer 112 has a lesser thickness than ink layer 118.

In some embodiments, ink layer 118 may be any suitable ink that maintains a sufficient adherence to first layer 112, for example, ink layer 118 has an adherence to first layer 112 of greater than or equal to 4B according to a cross hatch adhesion test set forth in ASTM D3359-17. In some embodiments, ink layer 118 is a solvent-based ink. In some embodiments, ink layer 118 may be thermally cured, for example in an oven, or cured by exposure to radiation, such as ultraviolet light (i.e., uv curable). Ink layer 118 may be made up of at least one ink layer. Thus in some embodiments, ink layer 118 may be a single ink layer and in other embodiments, ink layer 118 may be multiple ink layers (e.g., two ink layers, three ink layers, four ink layers, etc.).

First surface 120 of ink layer 118 provides a textured surface to article 100. In some embodiments, the textured surface also functions as a tactile feature that provides tactile feedback when touched. In some embodiments, first surface 120 of ink layer 118 provides a textured surface that functions as a tactile feature based on a surface roughness Ra of first surface 120 of ink layer 118 being at least 50 nm. In some embodiments, first surface 120 of ink layer 118 has a surface roughness Ra as a result of a plurality of features 124.

In some embodiments, ink layer 118 may have a thickness in a range from 5 µm to 25 µm, from 5 µm to 20 µm, from 5 µm to 15 µm, from 10 µm to 25 µm, from 10 µm to 20 µm, from 15 µm to 25 µm, or any ranges and subranges therebetween. In some embodiments, ink layer 118 may have a thickness of at least 5 µm, at least 10 µm, at least 15 µm, or at least 20 µm. The thickness is measured using an optical surface profiler, such as the 3D Optical Surface Profiler available from Zygo Corporation. In some embodiments, the above specified thicknesses facilitate tactile feedback based on surface roughness Ra.

In some embodiments, ink layer 118 are damage resistant and scratch resistant. For example, ink layer 118 may have a gauge hardness value of 4H or greater, 5H or greater, or 6H according to a pencil test set forth in ASTM D3363-05 (2011)e2 and/or a scratch value of 3H or greater, 4H or greater, 5H or greater, or 6H according to a pencil test set forth in ASTM D3363-05(2011)e2.

Figure 2:
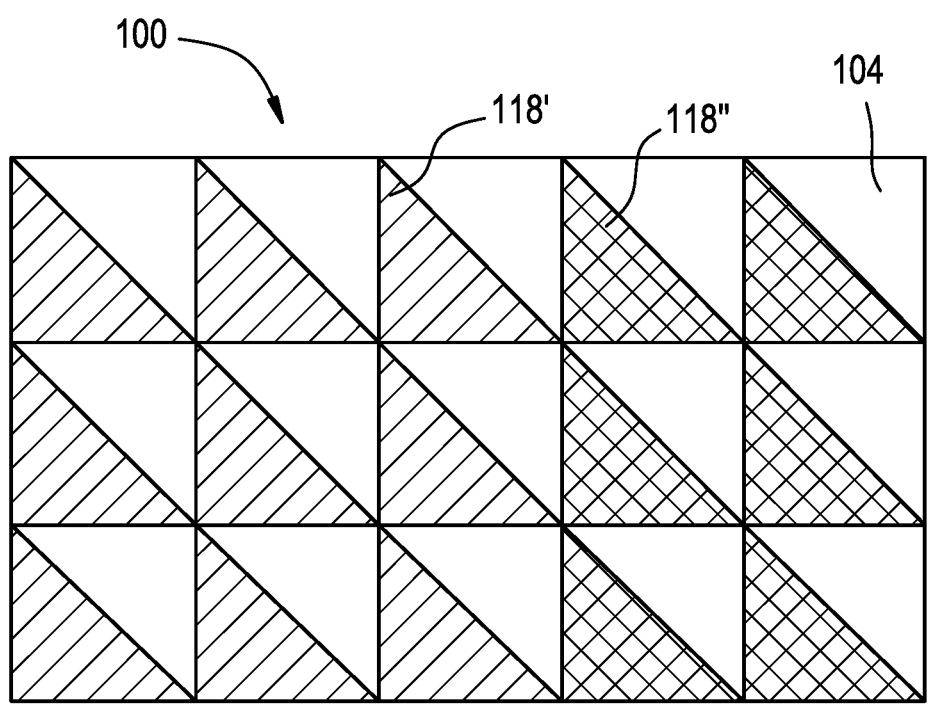
FIG. 2 is a top view of the exemplary article of FIG. 1.

As shown in FIG. 1 and FIG. 2, in some embodiments, first layer 112 covers only a portion first major surface 104 of substrate 102 For example first layer 112 may be applied to first major surface 104 of substrate 102 in a first pattern. In some embodiments, first pattern may be applied as a single contiguous body or in other embodiments, may be applied as multiple noncontiguous bodies. In FIG. 2 the first pattern is shown as a series of triangle shapes. However, this is merely exemplary and the first pattern may include, but is not limited to, lines, shapes, and designs. In some embodiments (not shown), first layer 112 covers first major surface 104 of substrate 102 in its entirety.

In some embodiments, ink layer 118 may be applied to first layer 112 in a second pattern wherein the second pattern is the same as the first pattern. In other embodiments, the second pattern may be different than the first pattern such that there are portions of first layer 112 not covered with ink layer 118. In some embodiments, as shown for example in FIG. 2, ink layer 118 may include a first ink layer 118' applied to a first portion of the first pattern formed by first layer 112 and a second ink layer 120' applied to a second portion of the first pattern formed by first layer 112. First ink layer 118' and second ink layer 120' may differ by one or more of the following: pattern, color, thickness, surface roughness Ra, reflectance haze, transparency, average feature cross-section dimension, average feature height. FIG. 2 is merely exemplary and ink layer 118 may include may also include a third ink layer, a fourth ink layer, etc.

In some embodiments, an exemplary method for making the articles disclosed herein includes steps of applying first layer 112, curing first layer 112, applying ink layer 118, and curing ink layer 118.

First layer 112 may be applied to first surface 104 of substrate 102 using conventional methods suitable for applying first layer 112 in the desired pattern. For example, first layer 112 may be inkjet printed, screen printed, roll coated, or spray coated.

First layer 112 may be cured prior to applying ink layer 118. When first layer 112 is thermally curable, conventional heat sources can be used to cure first layer 112 including, but not limited to, an oven. When first layer 112 is curable by exposure to radiation, conventional radiation source can be used to cure first layer 112 including, but not limited to, an ultraviolet (uv) light source. First layer 112 may be applied as a single layer or in multiple sublayers.

Ink layer 118 may be applied to first surface 114 of first layer 112 using conventional methods suitable for applying ink layer in the desired pattern. For example, ink layer 118 may be inkjet printed or screen printed. Depending on the application method and desired attributes (e.g., thickness, surface roughness Ra, average feature cross-sectional dimension size, average feature height, etc.) of first surface 120 of ink layer 118, the ink may be applied in multiple sublayers to achieve the desired attributes. In some embodiments, as discussed above in connection with FIG. 2, ink layer 118 may include portions (e.g., first ink layer 118' and second ink layer 118") having different properties. In some embodiments, achieving different thicknesses for different portions of ink layer 118 can be accomplished at least by one of more of utilizing different inks, using different application methods, and/or applying a different number of sublayers. In some embodiments, achieving different color, reflectance haze, and transparency for different portions of ink layer 118 can be accomplished at least by utilizing different inks. In some embodiments, achieving different surface roughness Ra, average feature cross-section dimension, and average feature height can be accomplished at least by one or more of using different inks, using different application methods, and/or applying a different number of sublayers.

When ink layer 118 is thermally curable, conventional heat sources can be used to cure ink layer 118 including, but not limited to, an oven. When ink layer 118 is curable by exposure to radiation, conventional radiation source can be used to cure ink layer 118 including, but not limited to, an ultraviolet (uv) light source. When ink layer 118 is applied in multiple sublayers, the ink may be cured after application of each sublayer or once all the sublayers have been applied. When ink layer 118 has different portions, for example first layer 118' and second layer 118" and the different portions are applied at different times, the different portions can be cured at the same time or at different times.

Figure 3:
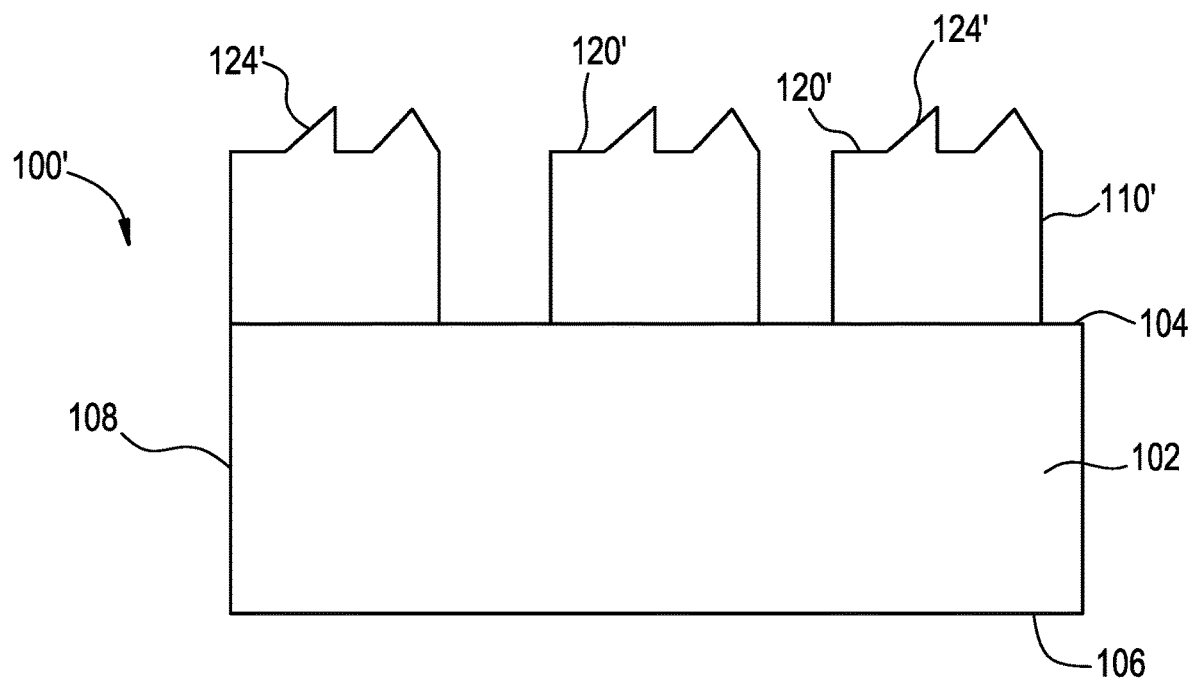
FIG. 3 is a side view of another exemplary article according to embodiments described herein.

FIG. 3 shows a side view of an exemplary article 100'. Article 100' is similar to article 100 in that the same type of substrate 102 may be used but an alternative coating 110' is disposed on first major surface 104 of substrate 102. In some embodiments, coating 110' has one or more of the following characteristics: (i) an adherence to substrate 102 of greater than or equal to 4B according to a cross hatch adhesion test set forth in ASTM D3359-17; (ii) a gauge hardness value of 4H or greater, 5H or greater, or 6H according to a pencil test set forth in ASTM D3363-05(2011)e2; (iii) a scratch value of 3H or greater, 4H or greater, 5H or greater, or 6H according to a pencil test set forth in ASTM D3363-05 (2011)e2. Thus, in some embodiments, coating 110' may exhibit suitable adherence to substrate, damage resistance, and/or scratch resistance.

In some embodiments, coating 110' may be a polymer based material and may be thermally cured, for example in an oven, or cured by exposure to radiation, such as ultraviolet light (i.e., uv curable). In some embodiments, coating 110' may contain a silicone resin component and in some embodiments, the silicon resin component may include a silsesquioxane component. In some embodiments, coating 110' may be an ink, for example an inkjet ink.

In some embodiments, a first surface 120' of coating 110' provides a textured surface to article 100'. In some embodiments, the textured surface also functions as a tactile feature that provides tactile feedback when touched. In some embodiments, first surface 120' of coating 110' provides a textured surface that functions as a tactile feature based on a surface roughness Ra of first surface 120' of coating 110' being at least 50 nm. In some embodiments, first surface 120' of coating 110' has a surface roughness Ra as a result of a plurality of features 124'. In some embodiments, coating 110' may have a thickness in a range from 5 μm to 25 μm, from 5 μm to 20 μm, from 5 μm to 15 μm, from 10 μm to 25 μm, from 10 μm to 20 μm, from 15 μm to 25 μm, or any ranges and subranges therebetween. In some embodiments, ink layer 118 may have a thickness of at least 5 μm, at least 10 μm, at least 15 μm, or at least 20 μm. The thickness is measured using an optical surface profiler, such as the 3D Optical Surface Profiler available from Zygo Corporation. In some embodiments, the above specified thicknesses facilitate tactile feedback based on surface roughness Ra. In some embodiments, coating 110' may be made up of at least one layer. Thus in some embodiments, coating 110' may be a single layer and in other embodiments, coating 110' may be multiple layers (e.g., two layers, three layers, four layers, etc.) to achieve the desired thickness.

As shown in FIG. 3, in some embodiments, coating 110' covers only a portion first major surface 104 of substrate 102 For example, coating 110' may be applied to first major surface 104 of substrate 102 in a pattern. In some embodiments, the pattern may be applied as a single contiguous body or in other embodiments, may be applied as multiple noncontiguous bodies. The pattern may include, but is not limited to, lines, shapes, and designs. In some embodiments (not shown), coating 110' covers first major surface 104 of substrate 102 in its entirety.

Coating 110' may be applied to first surface 104 of substrate 102 using conventional methods suitable for applying coating 110' in the desired pattern. For example, coating 110' may be inkjet printed, screen printed, roll coated, or spray coated. When coating 110' is thermally curable, conventional heat sources can be used to cure first coating 110' including, but not limited to, an oven. When coating 110' is curable by exposure to radiation, conventional radiation source can be used to cure coating 110' including, but not limited to, an ultraviolet (uv) light source. Coating 110' may be applied as a single layer or in multiple sublayers.

In some embodiments, first surface 120 of ink layer 118 or first surface 120' of coating 110' may have a surface roughness Ra in a range from 50 nm to 1,000 nm, from 50 nm to 900 nm, from 50 nm to 800 nm, from 50 nm to 700 nm, from 50 nm to 600 nm, from 50 nm to 500 nm, from 100 nm to 1,000 nm, from 100 nm to 900 nm, from 100 nm to 800 nm, from 100 nm to 700 nm, from 100 nm to 600 nm, from 100 nm to 500 nm, from 200 nm to 1,000 nm, from 200 nm to 900 nm, from 200 nm to 800 nm, from 200 nm to 700 nm, from 200 nm to 600 nm, from 200 nm to 500 nm, from 300 nm to 1,000 nm, from 300 nm to 900 nm, from 300 nm to 800 nm, from 300 nm to 700 nm, from 300 nm to 600 nm, from 300 nm to 500 nm, from 400 nm to 1,000 nm, from 400 nm to 900 nm, from 400 nm to 800 nm, from 400 nm to 700 nm, from 500 nm to 1,000 nm, from 500 nm to 900 nm, from 500 nm to 800 nm, from 500 nm to 700 nm or all ranges and subranges therebetween. In some embodiments, first surface 120 of ink layer 118 and first surface 120' of coating 110' may have a surface roughness Ra of at least 50 nm, at least 100 nm, at least 150 nm, at least 200 nm, at least 250 nm, at least 300 nm, at least 400 nm, or at least 500 nm. Surface roughness Ra measurements may be made over a sample surface section having dimensions of about 0.5 mm by 0.5 mm using an optical surface profiler, such as the 3D Optical Surface Profiler available from Zygo Corporation.

In some embodiments, first surface 120 of ink layer 118 and first surface 120' of coating 110' has a surface roughness Ra as a result of a plurality of features 124, 124' respectively. In some embodiments, features 124, 124' have an average cross-sectional dimension in a range from 20 µm to 200 µm, from 20 µm to 150 µm, from 20 µm to 100 µm, from 20 µm to 50 µm, from 30 µm to 200 µm, from 30 µm to 150 µm, from 30 µm to 100 µm, from 30 µm to 50 µm, from 40 µm to 200 µm, from 40 µm to 150 µm, from 40 µm to 100 µm, from 50 µm to 200 µm, from 50 µm to 150 µm, from 50 µm to 100 µm, or all ranges and subranges therebetween. The average cross-section dimension of the features may be measured by selecting a 0.5 mm by 0.5 mm section of the first surface 120 of ink layer 118 or first surface 120' of coating 110', viewing the section with an optical microscope under 200× magnification, measuring the longest cross-sectional dimension in the x-y plane for each feature, and calculating the average.

In some embodiments, features 124, 124' have an average height in the z direction in a range from 0.5 µm to 100 µm, from 0.5 µm to 75 µm, from 0.5 µm to 50 µm, from 0.5 µm to 25 µm, from 1 µm to 100 µm, from 1 µm to 75 µm, from 1 µm to 50 µm, from 1 µm to 25 µm, from 3 µm to 100 µm, from 3 µm to 75 µm, from 3 µm to 50 µm, from 3 µm to 25 µm, from 5 µm to 100 µm, from 5 µm to 75 µm, from 5 µm to 50 µm, from 5 µm to 25 µm, from 10 µm to 100 µm, from 10 µm to 75 µm, from 10 µm to 50 µm, from 10 µm to 25 µm, or all ranges and subranges therebetween. The average height of the features may be measured over a sample surface section having dimensions of about 0.5 mm by 0.5 mm using an optical surface profile, such as the 3D Optical Surface Profiler available from Zygo Corporation.

In some embodiments, article 100, 100' may exhibit a reflectance haze (as measured at surface 120 of ink layer 118 or surface 120' of coating 110') in a range from 1% to 100%, from 1% to 90%, from 1% to 80%, from 1% to 70%, from 1% to 60%, from 1% to 50%, from 1% to 40%, from 1% to 30%, from 1% to 20%, from 5% to 100%, from 5% to 90%, from 5% to 80%, from 5% to 70%, from 5% to 60%, from 5% to 50%, from 5% to 40%, from 5% to 30%, from 5% to 20%, from 10% to 100%, from 10% to 90%, from 10% to 80%, from 10% to 70%, from 10% to 60%, from 10% to 50%, from 10% to 40%, from 10% to 30%, from 10% to 20%, from 20% to 100%, from 20% to 90%, from 20% to 80%, from 20% to 70%, from 20% to 60%, from 20% to 50%, from 20% to 40%, from 20% to 30%, from 30% to 100%, from 30% to 90%, from 30% to 80%, from 30% to 70%, from 30% to 60%, from 30% to 50%, from 30% to 40%, from 40% to 100%, from 40% to 90%, from 40% to 80%, from 40% to 70%, from 40% to 60%, from 40% to 50%, from 50% to 100%, from 50% to 90%, from 50% to 80%, from 50% to 70%, from 50% to 60%, or all ranges and subranges therebetween. The reflectance haze is measured according to ASTM E430-11 using a Rhopoint IQ available from Rhopoint Instruments Ltd.

In some embodiments, article 100, 100' may exhibit a gloss (as measured at surface 120 of ink layer 118 or surface 120' of coating 110') at 60° in a range from 1% to 80%, from 1% to 70%, from 1% to 60%, from 1% to 50%, from 1% to 40%, from 1% to 30%, from 1% to 20%, from 5% to 80%, from 5% to 70%, from 5% to 60%, from 5% to 50%, from 5% to 40%, from 5% to 30%, from 5% to 20%, from 10% to 80%, from 10% to 70%, from 10% to 60%, from 10% to 50%, from 10% to 40%, from 10% to 30%, from 10% to 20%, from 20% to 80%, from 20% to 70%, from 20% to 60%, from 20% to 50%, from 20% to 40%, from 20% to 30%, from 30% to 80%, from 30% to 70%, from 30% to 60%, from 30% to 50%, from 30% to 40%, from 40% to 80%, from 40% to 70%, from 40% to 60%, from 40% to 50%, from 50% to 80%, from 50% to 70%, from 50% to 60%, or all ranges and subranges therebetween. The gloss is measured at 60° according to ASTM D523-14 using a Rhopoint IQ available from Rhopoint Instruments Ltd.

In some embodiments, as noted above ink layer 118 and coating 110' have suitable gauge hardness (for example a value of 4H or greater, 5H or greater, or 6H as determined by a pencil test) and/or suitable scratch hardness (for example a value of 3H or greater, 4H or greater, 5H or greater, or 6H as determined by a pencil test) such that an additional protective coating is not needed for improving the damage resistance and/or scratch resistance of ink layer 118 and coating 110'. Thus, in some embodiments, an additional protective coating, such as a powder coating, is not disposed on ink layer 118 or coating 110'.

Figure 4:
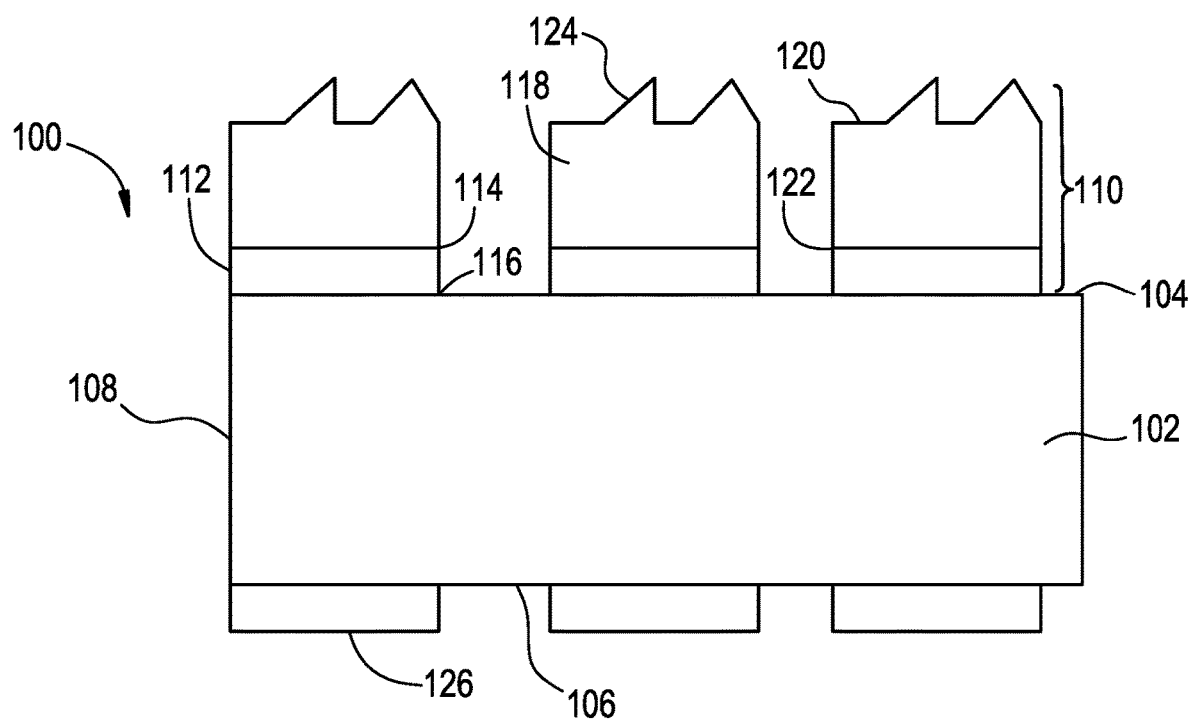
FIG. 4 is a side view of the exemplary article of FIG. 1 having an extra layer 126.
Figure 5:
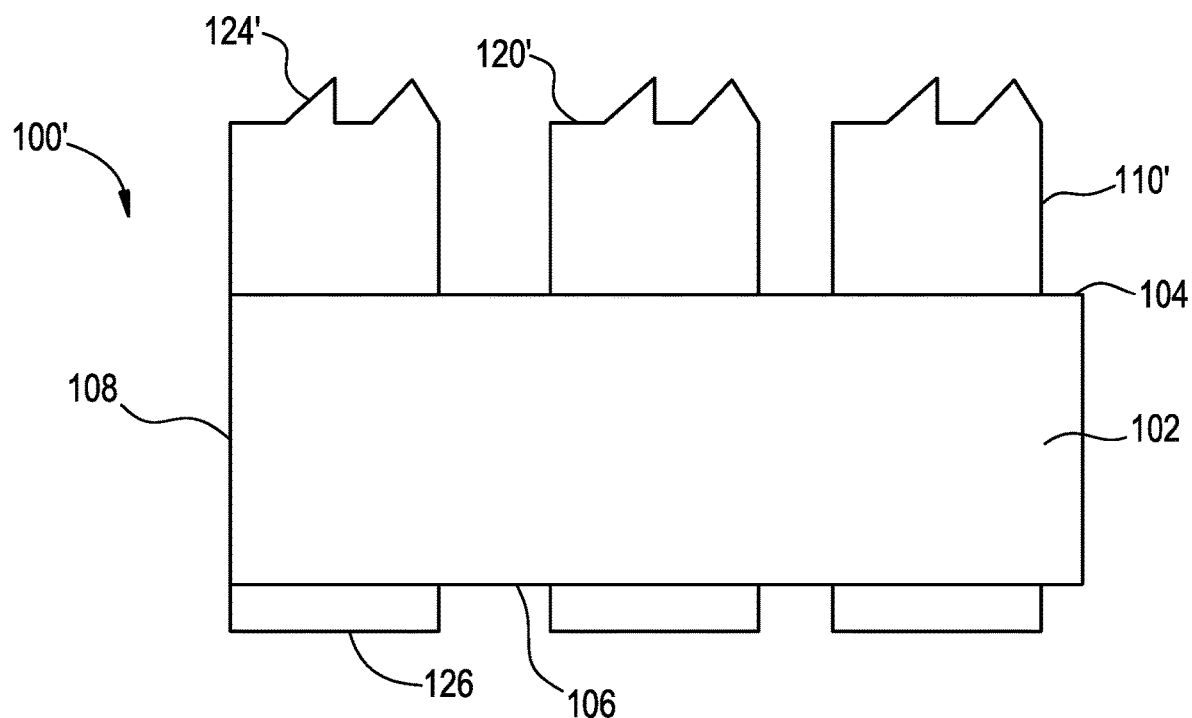
FIG. 5 is a side view of the exemplary article of FIG. 3 having an extra layer 126'.

In some embodiments, as shown in FIGS. 4 and 5, a layer 126 may be applied to second major surface 106 of substrate 102. In such embodiments, substrate 102 may be sufficiently transparent so that layer 126 may be seen when looking at first major surface 104 of substrate 102. In some embodiments, layer 126 may correspond to and be aligned with the pattern of first layer 112 or coating 110'. In other embodiments, layer 126 may correspond to and be aligned with only a portion of first layer 112 or coating 110'. In some embodiments, layer 126 may have higher resolution than ink layer 118 or coating 110' so that it creates depth to substrate 102.

Figure 6A:
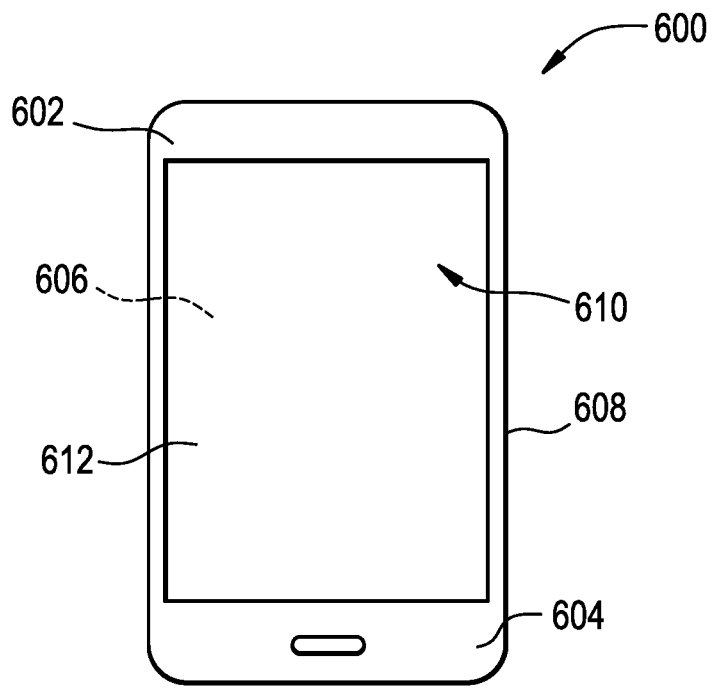
FIG. 6A is a plan view of an exemplary electronic device incorporating any of the strengthened articles disclosed herein.
Figure 6B:
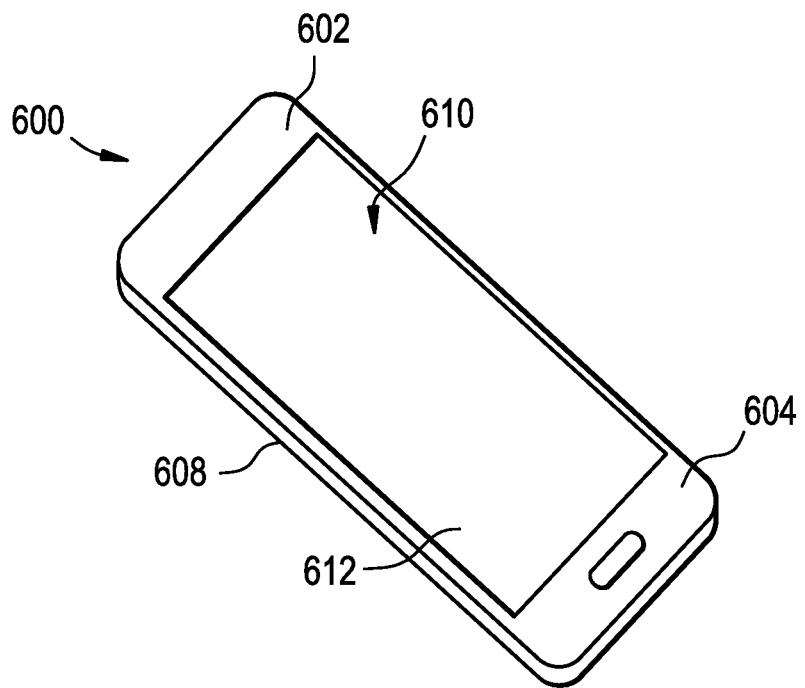
FIG. 6B is a perspective view of the exemplary electronic device of FIG. 6A.

The articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), or appliance articles. An exemplary article incorporating any of the substrates disclosed herein is shown in FIGS. 6A and 6B. Specifically, FIGS. 6A and 6B show a consumer electronic device 600 including a housing 602 having front 604, back 606, and side surfaces 608; electrical components (not shown) that are at least partially inside or entirely within the housing and including at least a controller, a memory, and a display 610 at or adjacent to the front surface of the housing; and a cover substrate 612 at or over the front surface of the housing such that it is over the display. In some embodiments, at least one of a portion of the housing or the cover substrate comprises the articles/substrates disclosed herein. In some embodiments, article 100, 100' is incorporated into consumer electronic device 600 such that first major surface 102 of substrate 100 faces the user of consumer electronic device 600. In some embodiments, coating 110, 110' may be applied before or after article 100, 100' is incorporated into the other article.

It will be apparent to those skilled in the art that various modifications and variations can be made without departing from the spirit or scope of the invention.

What is claimed is:

1. An article comprising:
   a substrate comprising a first major surface and a second major surface opposite the first major surface;
   a first layer disposed on the first major surface, wherein the first layer comprises a silicone resin component, the first layer has an adherence to the substrate of greater than or equal to 4B according to a cross hatch adhesion test set forth in ASTM D3359-17; and
   at least one ink layer disposed on the first layer, wherein the at least one ink layer has a surface roughness Ra greater than or equal to 50 nm to provide a textured surface.

2. The article of claim 1, wherein the silicone resin component comprises a silsesquioxane component.

3. The article of claim 1, wherein the first layer is an ink.

4. The article of claim 1, wherein the at least one ink layer has at least one of
   (i) a gloss at 60 degrees in a range from 1% to 80%,
   (ii) a reflectance haze at 20 degrees in a range from 1% to 80%, or
   (iii) an adherence to the first layer greater than or equal to 4B according to a cross hatch adhesion test set forth in ASTM D3359-17.

5. The article of claim 1, wherein the substrate comprises one of glass, glass ceramic, or polymer material.

6. The article of claim 1, wherein the at least one ink layer has a gauge hardness greater than or equal to 4H according to a pencil test set forth in ASTM D3363-05(2011)e2.

7. The article of claim 1, wherein the at least one ink layer has a scratch hardness greater than or equal to 3H according to a pencil test set forth in ASTM D3363-05(2011)e2.

8. The article of claim 1, wherein a powder coating is not disposed on the at least one ink layer.

9. The article of claim 1, wherein the first layer is a first pattern that does not completely cover the first surface.

10. The article of claim 9, wherein the at least one ink layer is a second pattern that is the same as the first pattern.

11. The article of claim 9, wherein the at least one ink layer comprises a first ink layer applied to a first portion of the first pattern and a second ink layer applied to a second portion of the first pattern.

12. The article of claim 11, wherein the first ink layer and the second ink layer are different colors.

13. The article of claim 12, wherein the first ink layer and the second ink layer have a different surface roughness Ra.

14. The article of claim 1, wherein the first layer has a thickness of about 3 μm or less.

15. The article of claim 1, wherein the a thickness of the first layer is less than a thickness of the at least one ink layer.

16. A method for creating a textured surface, the method comprising:
   applying a first layer to a first surface of substrate such that the first layer has an adherence to the substrate of great than or equal to 4B according to a cross hatch adhesion test set forth in ASTM D3359-17, wherein the first layer comprises a silicone resin component; and
   applying at least one ink layer to the first layer, wherein the at least one ink layer has a surface roughness Ra greater than or equal to 50 nm to provide a textured surface.

17. The method of claim 16, wherein the first layer is applied as a first pattern that does not completely cover the first surface.

18. The method of claim 17, wherein the at least one ink layer is applied as a second pattern that is the same as the first pattern.

19. The method of claim 17, wherein the at least one ink layer comprises a first ink layer applied to a first portion of the first pattern and a second ink layer applied to a second portion of the first pattern.

20. The method of claim 19, wherein the first ink layer and second ink layer or different colors.

21. The method of claim 19, wherein the first ink layer and the second ink layer have a different surface roughness Ra.

22. The method of claim 16, wherein the at least one ink layer has at least one of
   (i) a gloss at 60 degrees in a range from 1% to 80%,
   (ii) a reflectance haze at 20 degrees in range from 1% to 100%, or
   (iii) an adherence to the first layer greater than or equal to 4B according to a cross hatch adhesion test set forth in ASTM D3359-17.

23. The method of claim 16, wherein the substrate comprises one of a glass, glass ceramic, or polymer material.

* * * * *

UNITED STATES PATENT AND TRADEMARK OFFICE
CERTIFICATE OF CORRECTION

PATENT NO. : 10,921,860 B2
APPLICATION NO. : 16/190930
DATED : February 16, 2021
INVENTOR(S) : Matthew Wade Fenton et al.

It is certified that error appears in the above-identified patent and that said Letters Patent is hereby corrected as shown below:

On the Title Page

In Column 2, item (57), Abstract, Line 6, delete "equal 50" and insert -- equal to 50 --, therefor.

In the Claims

In Column 9, Line 66, Claim 5, delete "of" and insert -- of a --, therefor.

In Column 10, Line 25, Claim 15, delete "the a" and insert -- the --, therefor.

In Column 10, Line 31, Claim 16, delete "great" and insert -- greater --, therefor.

In Column 10, Line 50, Claim 20, delete "or" and insert -- are --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*